Patented Jan. 8, 1924.

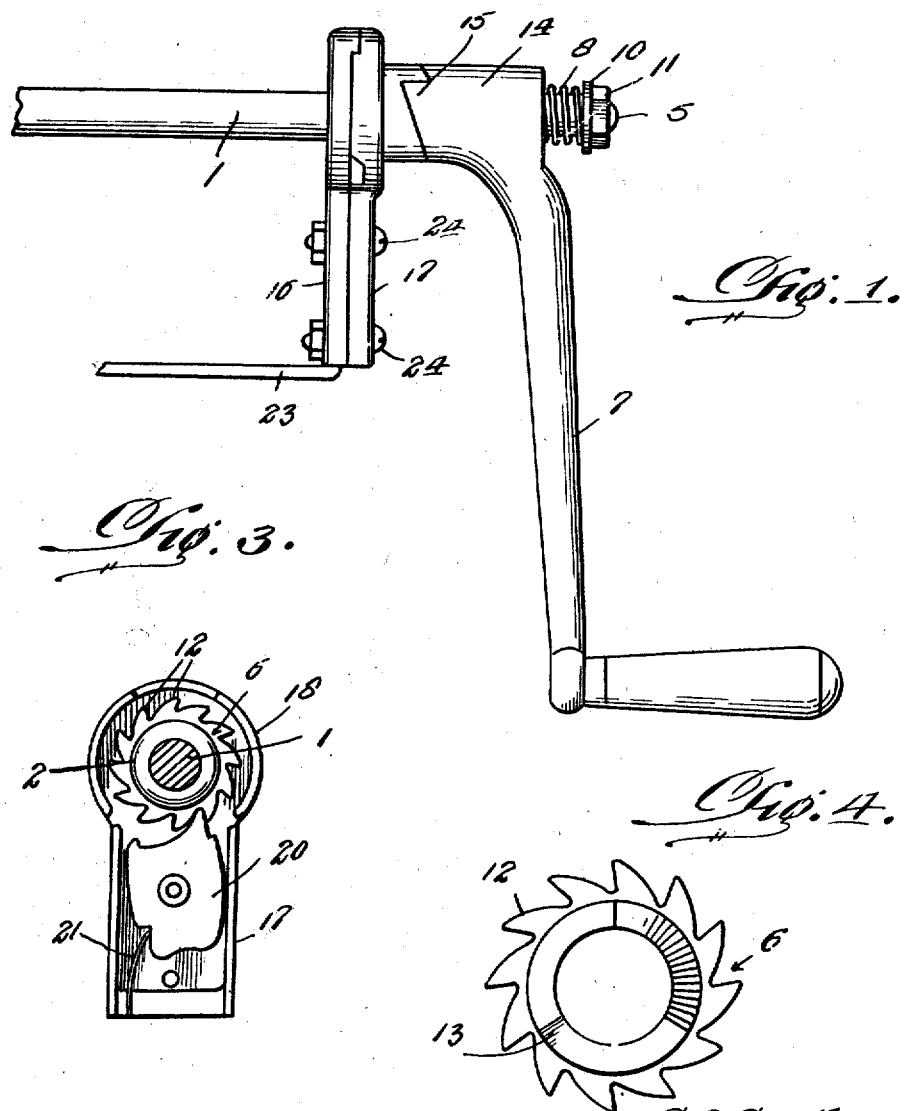

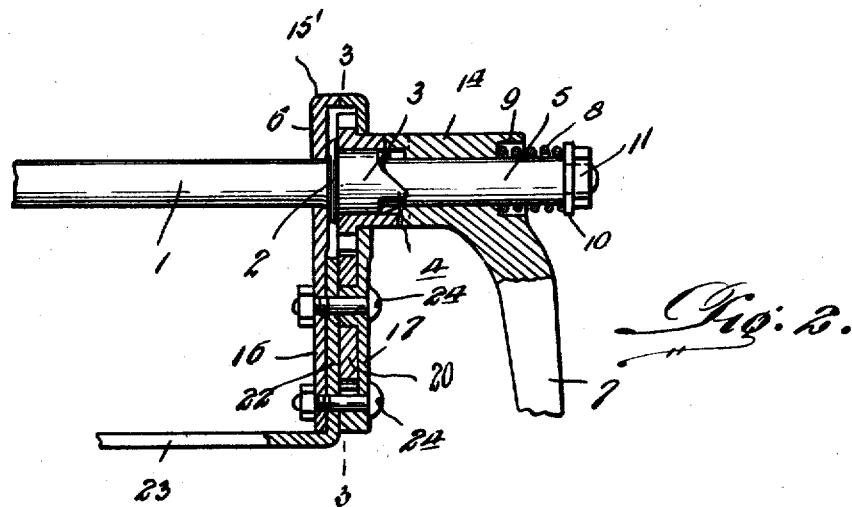

1,480,061

UNITED STATES PATENT OFFICE.

GUSTAF OLOF GUSTAFSON, OF BRANFORD, CONNECTICUT.

SAFETY CRANKING MEANS FOR INTERNAL-COMBUSTION ENGINES.

Application filed February 20, 1923. Serial No. 620,141.

*To all whom it may concern:*

Be it known that I, GUSTAF O. GUSTAFSON, a citizen of the United States, residing at Branford, in the county of New Haven and State of Connecticut, have invented certain new and useful Improvements in Safety Cranking Means for Internal-Combustion Engines, of which the following is a specification.

The object of my said invention is the provision of simple and efficient safety cranking means for internal combustion engines—i. e., means whereby in the event of an engine back-firing, the crank will be automatically released from the shaft and in that way injury to the operator will be averted.

To the attainment of the foregoing, the invention consists in the improvement as hereinafter described and definitely claimed.

In the accompanying drawings, forming part of this specification:—

Figure 1 is a side elevational view illustrative of my improvement.

Figure 2 is a detail section of a portion of the improvement.

Figure 3 is a vertical detail sectional view upon the line 3—3 of Figure 2.

Figure 4 is a face view of the combined clutch and ratchet unit of my improvement.

Figure 5 is a sectional view through the engine shaft, the same being shown formed with clutch teeth, and Figures 6 and 7 are plan views of the parts forming what may be termed dog casing, which is an essential part of my invention.

The engine shaft is designated 1, and in furtherance of my invention, it is provided with a circumferential flange 2, a portion 3 outwardly beyond the flange 2 and formed on its end with spaced teeth 4 and a comparatively small portion 5 extending outwardly beyond the portion 3 and reduced and threaded at its end.

In combination with the shaft, 1 characterized as stated I employ the unit 6 best shown in Figures 2, 3 and 4, and the crank 7 best shown in Figures 1 and 2, the said crank 7 being backed by a coiled spring 8, this coiled spring being within a socket 9 in the crank 7 at one end, and being backed by a washer 10 and nut 11 at the opposite end. The unit 6 is provided with peripheral rachet teeth 12, and with clutch teeth 13 at its outer end, and it will be noticed in this connection that the faces of the said teeth 13 are correspondingly inclined, and that the faces of the teeth 4 of the shaft portion 3 are inclined in the same direction as the faces of said teeth 13. The crank 7 is provided with a hub portion 14 mounted and movable about the shaft portion 5 and endwise on the same, against the action of the said spring 8, and at the inner end of the said portion 14 are inclined clutch teeth 15 opposed to the clutch teeth 4 of the shaft portion 3 and to the teeth 13 of the unit 6.

Upon the shaft 1, as well as the element 6, is a housing designated in general by the numeral 15. This housing constitutes the provision of an inner and outer plate member 16 and 17 respectively, the same being more clearly shown in Figures 6 and 7. The upper ends of each of these plate members are rounded as shown, these rounded ends being formed with intergaging inwardly projecting flanges 18. The rounded ends of each of these plates are each formed with a central opening 16' and 17' respectively, it being noted that the opening within the plate 16 is relatively smaller than the opening within the plate 17, the said plate 16 being positioned upon the shaft 1, directly rearwardly of the circumferential flange 2, while the plate 17 is supported upon the element 6, the peripheral teeth 12 of this element being disposed within the said housing formed by these plates.

The plate 17 of the housing 15 is formed with an inwardly extending boss 19, over which is loosely positioned a dog 20, the same being maintained in its position shown in Figure 3 by the band spring 21. The plates 16 and 17 have disposed therebetween the upwardly bent end 22 of the bracket arm 23, the said plates as well as the said end of the bracket arm being maintained in close engagement with each other through the instrumentality of fastening bolts 24.

With the elements of my improvement relatively arranged as shown in Figures 1 and 2, it will be seen that clockwise rotation of the crank 7 will be attended by corresponding rotation of the shaft 1 to start the engine, this because of the square end of the teeth 15 engaging the square end of the teeth 4, and it will also be seen that in the event of the engine back-firing and rotating the shaft 1 in a reverse direction, the teeth 4 of the shaft 1, engaging the clutch teeth 15 of the crank 7, will rotate this crank in a reversed direction for a distance approximately equal to the distance between the adjacent clutch teeth, it being, of course, understood that the said teeth 15 are also in engagement with the teeth 13 of the element 6, and in view of the fact that this element 6 is held against retrograde movement through the instrumentality of the dog 20, the clutch teeth 15 will override the clutch teeth 13 of the unit 6 for consequently forcing the crank 7 backwards upon the reduced end 5 of the shaft 1 against the tension of the spring 8. Manifestly in virtue of this, there will be no likelihood of the operator being injured by the crank in the event of the engine back-firing.

Having thus described my invention, what I claim as new and desire to secure by Letters Patent, is:—

1. In a safety cranking means, the combination with a shaft having a circumferential flange, a portion outwardly beyond the flange and bearing at its outer end an inclined tooth, and a reduced portion outwardly beyond said tooth-bearing portion; of a unit loosely surrounding said tooth-bearing portion of the shaft and having peripheral ratchet teeth and also having inclined clutch teeth, a crank loosely mounted on the reduced portion of the shaft and having comparatively deep inclined clutch teeth at its inner end to engage and be engaged by the tooth of the shaft and to engage the clutch teeth of the said unit, and means on the shaft yieldingly pressing the crank inwardly.

2. In a safety cranking means, the combination with a shaft having a circumferential flange, a portion outwardly beyond the flange and bearing at its outer end an inclined tooth, and a reduced portion outwardly beyond said tooth-bearing portion; of a unit loosely surrounding said tooth-bearing portion of the shaft and having peripheral ratchet teeth and also having inclined clutch teeth at its outer end, a pawl arranged to co-operate with the ratchet teeth of said unit, a crank loosely mounted on the reduced portion of the shaft and having comparatively deep inclined clutch teeth at its inner end to engage and be engaged by the tooth of the shaft and to engage the clutch teeth of the said unit, an abutment on the outer end portion of the shaft, and a coiled spring surrounding the reduced portion of the shaft and interposed between the crank and said abutment.

In testimony whereof I affix my signature.

GUSTAF OLOF GUSTAFSON.